United States Patent
Schneider et al.

(10) Patent No.: US 12,466,765 B2
(45) Date of Patent: Nov. 11, 2025

(54) TRANSPARENT GLASS CERAMIC AND COVER PANE

(71) Applicant: SCHOTT AG, Mainz (DE)

(72) Inventors: Meike Schneider, Mainz (DE); Bernd Rüdinger, Mainz (DE); Uwe Martens, Mainz (DE)

(73) Assignee: SCHOTT AG, Mainz (DE)

( * ) Notice: Subject to any disclaimer, the term of this patent is extended or adjusted under 35 U.S.C. 154(b) by 165 days.

(21) Appl. No.: 18/542,213

(22) Filed: Dec. 15, 2023

(65) Prior Publication Data
US 2024/0199473 A1   Jun. 20, 2024

(30) Foreign Application Priority Data
Dec. 16, 2022 (DE) .................. 10 2022 133 594.1

(51) Int. Cl.
| | |
|---|---|
| C03C 10/00 | (2006.01) |
| C03B 32/02 | (2006.01) |
| C03C 21/00 | (2006.01) |
| H05K 5/03 | (2006.01) |

(52) U.S. Cl.
CPC .......... *C03C 10/0009* (2013.01); *C03B 32/02* (2013.01); *C03C 10/0054* (2013.01); *C03C 21/002* (2013.01); *H05K 5/03* (2013.01); *C03C 2204/00* (2013.01)

(58) Field of Classification Search
CPC .. H05K 5/03; C03C 10/0009; C03C 10/0027; C03C 10/0054; C03C 21/002; C03C 2204/00; C03C 3/087; C03C 3/093; C03C 32/02
See application file for complete search history.

(56) References Cited

U.S. PATENT DOCUMENTS

| | | | | |
|---|---|---|---|---|
| 11,319,244 B2 * | 5/2022 | Beall | ............ | C03C 3/097 |
| 2007/0259767 A1 * | 11/2007 | Siebers | ............ | C03C 10/0027 |
| | | | | 501/59 |
| 2010/0263525 A1 * | 10/2010 | Siebers | ............ | B32B 27/06 |
| | | | | 89/917 |
| 2020/0017399 A1 * | 1/2020 | Click | ............ | C03C 3/097 |
| 2020/0156994 A1 | 5/2020 | Li | | |
| 2020/0180992 A1 * | 6/2020 | Rai | ............ | C03C 21/002 |
| 2020/0239354 A1 | 7/2020 | Li | | |
| 2020/0346969 A1 * | 11/2020 | Li | ............ | C03C 3/076 |
| 2021/0292225 A1 * | 9/2021 | Umada | ............ | C03C 3/087 |
| 2022/0002189 A1 | 1/2022 | Furuta | | |
| 2022/0064054 A1 * | 3/2022 | Li | ............ | C03B 23/0302 |
| 2022/0081348 A1 | 3/2022 | Yokota | | |
| 2023/0183128 A1 * | 6/2023 | Dietrich | ............ | C03C 3/087 |

FOREIGN PATENT DOCUMENTS

| | | | | |
|---|---|---|---|---|
| CN | 117865488 A | * | 4/2024 | ............ C03B 32/02 |
| DE | 102006056088 | | 5/2008 | |
| DE | 102016211065 | | 12/2017 | |
| DE | 102021132738 | | 6/2023 | |

OTHER PUBLICATIONS

Beall, "Nanophase Glass-Ceramics", Journal of the American Ceramics Society, 1999, vol. 82, No. 1, pp. 63-74.
Wolgram Höland and George Beall, Glass-ceramic technology, The American Ceramic Society, 2002.
ASTM D1--3-13, "Standard Test Method for Haze and Luminous Transmittance of Transparent Plastics", Nov. 2013, 7 pages.
ISO 14782, "Plastics—Determination of haze for transparent materials", Second edition, Oct. 2021, 12 pages.

* cited by examiner

*Primary Examiner* — Kenneth Bukowski
(74) *Attorney, Agent, or Firm* — Ruggiero McAllister & McMahon LLC

(57) ABSTRACT

A transparent, chemically prestressable or chemically prestressed glass ceramic has a high transmittance, a low haze and a high crystal phase content of keatite solid solution. A method of making such a glass ceramic includes producing a silicate green glass with a melting process and subsequent hot shaping, temperature treating the silicate green glass with at least one nucleation step carried out in the temperature range of 690° C. to 850° C. for a period of 5 min to 72 h and at least one ceramization step carried out in the temperature range of 780° C. to 1100° C. for a period of 3 min to 150 h, and performing at least one ion exchange in an exchange bath at a temperature of the exchange bath between 370° C. and 500° C. for a period of between 2 hours and 50 hours.

23 Claims, No Drawings

TRANSPARENT GLASS CERAMIC AND COVER PANE

CROSS-REFERENCE TO RELATED APPLICATIONS

This application claims priority under 35 U.S.C. § 119 to German patent application DE 10 2022 133 594.1 filed on Dec. 16, 2022, the entire disclosure of which is incorporated herein by reference.

BACKGROUND OF THE DISCLOSURE

1. Field of the Disclosure

The present disclosure relates to a transparent, chemically prestressable or chemically prestressed glass ceramic, a method for its production, a cover pane made of such a glass ceramic and the use thereof, and to a digital display device which comprises such a cover pane.

2. Description of Related Art

The use of glass or glass ceramics as cover panes for electronic components and displays, especially for smartphones, has been known for a long time. These glass-based materials are preferably chemically prestressed in order to increase their mechanical strength.

As is known from the field of ceramics, multiphase materials such as fibre-reinforced ceramics or glasses have an intrinsically higher strength, since the phase boundaries reduce or suppress crack propagation. This suggests that even glass ceramics without prestressing have a higher strength than glass.

Glasses and glass ceramics from the $Li_2O$—$Al_2O_3$—$SiO_2$ system, referred to as LAS glasses and LAS glass ceramics, have proven to be particularly suitable here. They have $SiO_2$ and $Li_2O$ and $Al_2O_3$ as their main components. The glass ceramics used can be subdivided according to their main crystal phases, i.e., the crystal phases that represent the majority of the crystal phases (more than 50% by weight of the existing crystal phases): lithium disilicate and lithium disilicate-petalite glass ceramics, high-quartz solid solution glass ceramics, and keatite solid solution glass ceramics.

Lithium disilicate or lithium disilicate-petalite glass ceramics often have good optical properties, such as high transmittance and low haze. In these materials, chemical prestressing is generally based on an ion exchange with the residual glass phase; an ion exchange in the crystal phase, which contributes significantly to the increase in mechanical strength, is generally not achieved. On the contrary, ion exchange often leads to amorphization of the prestressed surface layer. The positive effects of the prestressing and of the glass-ceramic microstructure can therefore not be combined here. Furthermore, the compositions used to produce these glass ceramics must contain at least 10 percent by weight of $Li_2O$ in order to ensure the formation of a sufficient quantity of crystal phase. With the increased demand for $Li_2O$ in recent years, e.g., for use in lithium ion batteries, there has been a significant increase in the price of lithium raw materials, making the production of these glass ceramics considerably more expensive.

Glass ceramics with high-quartz solid solution as the main crystal phase have likewise been known for a long time. They are widely used to produce cooktops, mirror supports, etc., since they combine relatively low thermal expansion with high transparency and good industrial manufacturability. With $Li_2O$ contents of 2 to 6% by weight, they are also cheaper to produce. However, they are only suitable to a limited extent for use as cover panes since chemical prestressing is difficult and takes place only via the amorphous residual glass phase.

Glass ceramics with keatite as the main crystal phase, which can be produced from the high-quartz solid solution glass ceramics by tempering, often have increased scatter, which reduces the optical transmittance of the glass ceramic and leads to unwanted haze.

The theoretical conditions that must be met in order to produce a transparent glass ceramic are known in the prior art (Holand, Beall): the difference in the refractive index between the crystal phase and the residual glass phase and the crystallite size should be as small as possible. In particular, the small crystallite size can be achieved only with difficultly in the case of keatite solid solution glass ceramics (customary crystallite sizes are in the range of >100 nm), and therefore translucent or opaque glass ceramics are generally obtained.

Transparent keatite solid solution glass ceramics for use as cover panes have been described, for example, in German Application DE 10 2021 132 738.5 of the applicant. In the case of these glass ceramics, the prestressing process takes place via a prestressing of the crystal phase, which eliminates the abovementioned disadvantages of the prestressing of the amorphous phase as in lithium disilicate glass ceramics and leads to exceptionally good prestressing results.

It is likewise known from the prior art that nucleation in transparent high-quartz or keatite solid solution glass ceramics preferably takes place via mixed nucleation. In particular, the nucleating agent combinations $TiO_2/ZrO_2$ or $SnO_2/ZrO_2$ are used here. A combination of all three nucleating agents, i.e., $TiO_2/ZrO_2/SnO_2$, is also possible.

Nucleation with $TiO_2/ZrO_2$ has the disadvantage that the $TiO_2$ used as a nucleating agent forms a colouring ilmenite complex with $Fe_2O_3$, leading to an unwanted yellow-brown colouration of the glass ceramic. If $SnO_2$ is present in the composition at the same time, yellow discolouration also occurs. These colourations can be avoided by reducing the $Fe_2O_3$ content in the raw materials, although this is associated with higher raw material costs and is therefore not a preferred route for industrial production.

$SnO_2/ZrO_2$ nucleation does not have this disadvantage. However, these nucleating agents easily lead to high processing temperatures and an increased tendency for devitrification. Both together make it difficult to produce these glass ceramics economically.

SUMMARY OF THE DISCLOSURE

The object of the present disclosure is therefore to provide a transparent, chemically prestressable glass ceramic with keatite as the main crystal phase for use as a cover pane, which has high transmittance, namely a transmittance of $\tau_{vis} \geq 85\%$ at a thickness of 0.7 mm, low haze, expressed by haze≤5, and a high keatite content, namely a crystal phase content of at least 80% by weight of keatite solid solution, based on all crystal phases present in the glass ceramic, while avoiding unwanted colouration. Further aspects relate to a method for producing such a glass ceramic and its use as a cover pane.

The glass ceramic according to the disclosure has a high crystal phase content of keatite of at least 80% by weight of keatite solid solution, preferably at least 90% by weight, particularly preferably at least 95% by weight, based on all crystal phases in the glass ceramic. This high proportion of keatite solid solution in the total crystal content ensures the good prestressability of the glass ceramic. Furthermore, nucleating agent crystals, i.e., crystals which contain the nucleating agents $ZrO_2$ and/or $SnO_2$ and/or $SnZrO_4$ mixed crystal, can be present. Further crystal phases, such as high-quartz solid solution or spinels, e.g., gahnites, are preferably not present since they can reduce transmittance and/or lead to haze of the glass ceramic. The quantity of the amorphous residual glass phase of the glass ceramic is preferably less than 40% by weight, particularly preferably between 2% by weight and 30% by weight or between 5% by weight and 30% by weight. In order to ensure high transparency, the crystallite size of the keatite solution is less than 100 nm, preferably a maximum of 80 nm.

In a preferred embodiment, the glass ceramic comprises the components $SiO_2$, $Al_2O_3$ and $Li_2O$ as main components and $SnO_2$ and $ZrO_2$ as nucleating agents. For the purposes of the present disclosure, main components are understood to mean that the sum of these components is 85% or more (in percent by mass) of the glass ceramic. The terms percent by mass and percent by weight, abbreviated as % by weight, are used as synonyms in the context of the present disclosure.

In preferred embodiments, the quantity of these components in percent by mass is:

| | |
|---|---|
| $SiO_2$ | 58-72%, preferably 65-70%, and/or |
| $Al_2O_3$ | 18-23% and/or |
| $Li_2O$ | 2-5.5%, preferably 3-5%, and/or |
| $SnO_2$ | 1-2%, preferably 1-1.5%, and/or |
| $ZrO_2$ | 2.1-3%, preferably 2.2-2.9%. |

It is particularly advantageous for the transmittance of the resulting glass ceramic if the ratio (in each case based on percent by mass) of $Al_2O_3$ to $SiO_2$ is less than 0.33.

However, the ratio should preferably not be less than 0.2, otherwise the viscosity of the glass becomes so high that production by melting and shaping are made more difficult.

As an essential component of the crystal, there should be at least 2% by weight of $Li_2O$ in the glass ceramic. However, the total quantity is limited for economic reasons since the quantity has a direct impact on the cost of raw materials. In a preferred embodiment, the glass ceramic therefore contains a maximum of 5% by weight of $Li_2O$.

The quantity of nucleating agents is selected in such a way that a good nucleation effect is achieved with economically reasonable nucleation times (usually a few minutes to a few days). In this context, a good nucleation effect should be understood to mean that a sufficient number of nucleation crystals are formed and that the keatite solid solution growing on them do not exceed a maximum size of 100 nm, the size of the crystals being limited by the availability of the crystallite constituents and/or coming up against other crystallites. At the same time, an excess of nucleating agents should be avoided. As described above, larger quantities of $SnO_2$ and $ZrO_2$ lead to an increase in the tendency for devitrification. The sum of the nucleating agents $SnO_2$+$ZrO_2$ should nevertheless preferably be greater than 3.6% by weight, preferably greater than 3.8% by weight. However, the sum of the nucleating agents $SnO_2$+$ZrO_2$ should preferably be limited to a maximum of 5% by weight.

The glass ceramic should preferably be free of $TiO_2$ in order to prevent unwanted colouration by the above-described ilmenite complex.

In addition to $Li_2O$, the glass ceramic can contain further alkali oxides, preferably $Na_2O$ and/or KO up to 2% by weight, in order to improve the fusibility of the glass. Higher quantities of alkali oxides can lead to the formation of unwanted secondary phases, which generally have a negative effect on the optical or mechanical properties of the glass ceramic. The sum of $Na_2O$+$K_2O$ should preferably be less than 1% by weight.

In order to reduce the viscosity of the green glass and thus improve its manufacturability, alkaline earth oxides and/or ZnO can be used.

The component MgO occupies a special position among alkaline earth oxides since it can be incorporated into the crystal. Larger alkaline earth oxides, on the other hand, remain in the residual glass phase. The quantity and selection of alkaline earth oxides therefore directly influences the refractive index of the residual glass phase and thus the transmittance or haze.

It has been found that MgO in the glass ceramics according to the disclosure is preferably in the range from 0.1% by weight to 2% by weight, particularly preferably in the range from 0.4% by weight to 1.8% by weight.

MgO and $Li_2O$ can both be incorporated into the crystal phase, and the total quantity thereof in the glass ceramics according to the disclosure should preferably not exceed 5.5% by weight, otherwise the haze increases.

It has proven particularly advantageous for high transmittance and low haze if the ratio (MgO+$Li_2O$)/($Al_2O_3$/$SiO_2$) is less than 19, preferably less than 18.8, the contents of the components being given in % by weight.

If present, the CaO content is up to 2% by weight, the proportion thereof preferably being from 0.2% by weight to 1.5% by weight, larger proportions of CaO leading to a reduction in transmittance.

The larger alkaline earths such as SrO and BaO increase the refractive index of the residual glass phase. However, in contrast to glass ceramics that have been seeded with $TiO_2$ and $ZrO_2$, this leads to a reduction in transmittance in the case of glass ceramics with $SnO_2$—$ZrO_2$ nucleation. In one embodiment, the glass ceramic according to the disclosure therefore contains less than 2% by weight of SrO and/or BaO.

The ZnO component likewise has a positive effect on the transmittance and viscosity; the glass ceramic preferably contains 0 to 2% by weight of ZnO.

Surprisingly, it has been found that the components MgO, $Li_2O$, SrO, CaO and BaO influence transmittance in the way they interact: the condition MgO+$Li_2O$—SrO—CaO—Bao<5% by weight should be met in order to achieve particularly high transmittance.

In some embodiments, the glass ceramic can contain up to 2% by weight of the usual fining agents such as $As_2O_3$, $Sb_2O_3$, halides or sulphur-containing compounds. Since the $SnO_2$ contained as a nucleating agent also acts as a fining agent, the use of a further fining agent can usually be dispensed with. For reasons of environmental protection and occupational safety, the glass ceramic is preferably substantially free of arsenic and antimony. This also applies to other toxic or environmentally harmful components such as PbO, $TeO_2$, CdO, and the like.

"Substantially free" is understood to mean that only impurities that are unavoidable in a customary and economical procedure (e.g., due to raw materials) are present.

The glass ceramic is also preferably substantially free of colouring components, in particular free of $V_2O_5$, colouring rare earths such as $Nd_2O_3$, $Er_2O_3$, $CeO_2$, and colouring metal oxides such as CoO, NiO, $Cr_2O_3$ or CuO.

The iron content of the glass ceramic, stated in percent by weight of $Fe_2O_3$, should preferably be less than 1000 ppm, particularly preferably less than 500 ppm, in order to avoid unwanted colouration of the material. Here, the iron content of the glass ceramic is the result of unavoidable contamination of the raw materials. By using low-iron raw materials, the quantity of iron can be reduced and a better (more neutral) intrinsic colour of the glass ceramic can be achieved, but this is generally associated with higher raw material costs.

The glass ceramic can contain $B_2O_3$. If present, the $B_2O_3$ content is preferably up to 2% by weight to reduce viscosity. Higher levels of $B_2O_3$ should be avoided since it has been shown that $B_2O_3$ can adversely affect the prestressability of the glass ceramic.

The glass ceramic according to the disclosure can contain $P_2O_5$ in order to reduce the viscosity and the processing temperatures. However, the proportion of $P_2O_5$ should preferably be limited to less than 2% by weight, otherwise transmittance is reduced. If production by the float process is desired, the glass ceramic should furthermore contain less than 1.5% by weight of $P_2O_5$, preferably less than 0.5% by weight, or should be substantially free of $P_2O_5$.

The glass ceramic according to the disclosure is suitable to produce a cover pane, for example in electronic devices, in particular in electronic display devices, in particular in mobile electronic display devices, for example in mobile touch panels and/or mobile digital display devices such as smartphones or smart watches and touch panels in general.

The cover pane preferably has a thickness of 0.4 mm to 1 mm. The method for producing a glass ceramic comprises the following steps:
producing a silicate green glass by a melting process and subsequent hot shaping, and
temperature treating the silicate green glass with at least one nucleation step carried out in the temperature range of 690° C. to 850° C. for a period of 5 minutes to 72 hours, preferably 30 minutes to 2 hours, and at least one ceramization step carried out in the temperature range of 780° C. to 1100° C. for a period of 3 minutes to 150 hours, preferably 3 minutes to 8 hours.

To produce a prestressed glass ceramic, in particular according to an embodiment for use as a cover pane, the following step follows the two above steps:
performing at least one ion exchange in an exchange bath having a composition of 100% by weight to 0% by weight $KNO_3$ and 0% by weight to 100% by weight $NaNO_3$ and 0% by weight to 5% by weight $LiNO_3$ at a temperature of the exchange bath between 370° C. and 500° C. and for a period of between 2 hours and 50 hours.

Without restricting generality, the hot shaping can be carried out by floating, rolling, drawing or ingot casting, for example.

The cover pane made of prestressed glass ceramic is not only transparent but also colour-neutral and high-strength.

An exchange bath is understood to mean a salt melt, wherein this salt melt is used in an ion exchange process for a glass or a glass article. In the context of the present disclosure, the terms exchange bath and ion exchange bath are used as synonyms.

As a rule, salts of technical purity are used for exchange baths. This means that, despite the use of, for example, only sodium nitrate as a starting material for an exchange bath, certain impurities are still included in the exchange bath. Here, the exchange bath is a melt of a salt, that is to say, for example, sodium nitrate, or a mixture of salts, for example a mixture of a sodium and a potassium salt. In this case, the composition of the exchange bath is specified in a form so that it refers to the nominal composition of the exchange bath without taking into account any impurities that can be present. Therefore, where a 100% sodium nitrate melt is referred to in the context of the present disclosure, this means that only sodium nitrate was used as raw material. However, the actual content of sodium nitrate in the exchange bath can deviate from this and generally will do so, since technical raw materials, in particular, contain a certain proportion of impurities. However, this is generally less than 5% by weight, based on the total weight of the exchange bath, in particular less than 1% by weight.

Correspondingly, in the case of exchange baths which have a mixture of different salts, the nominal contents of these salts are stated without taking into account impurities in the starting materials that are present for technical reasons. An exchange bath with 90% by weight of $KNO_3$ and 10% by weight of $NaNO_3$ can therefore likewise contain small amounts of impurities, which, however, are due to the raw materials and should generally be less than 5% by weight, based on the total weight of the exchange bath, in particular less than 1% by weight.

Furthermore, the composition of the exchange bath also changes in the course of the ion exchange since, due to the continued ion exchange, lithium ions, in particular, migrate from the glass or the glass article into the exchange bath. However, in the present case, such a change in the composition of the exchange bath due to ageing is likewise not taken into account, unless expressly stated otherwise. Rather, in the context of the present disclosure, it is the nominal original composition that is taken as a basis when specifying the composition of an exchange bath.

SUMMARY OF THE DISCLOSURE

The disclosure is explained in greater detail below by means of examples.

The compositions of glass-ceramic materials according to the disclosure can be found in Table 1 (all data in percent by weight). The abbreviation MO stands for the sum of alkaline earth oxides and ZnO.

The materials listed in Table 1 were melted and refined at temperatures of approx. 1600° C. to 1680° C. using raw materials customary in the glass industry. The charge was first melted in crucibles made of sintered silica glass and then poured into Pt/Rh crucibles with inner crucibles made of silica glass and homogenized by stirring at temperatures of approx. 1550° C. for 30 minutes. After standing at 1640° C. for 2 hours, castings of approx. 140 mm×100 mm×30 mm size were cast and stress-relieved in an annealing lehr at approx. 620° C. to 680° C. and cooled to room temperature. The test samples for measuring the properties in the glassy state and for the ceramization processes were prepared from the castings.

As a rule, two-stage programs were used for the ceramization processes, and these are indicated in Table 1. In this case, the starting glasses are first heated from room temperature to a nucleation temperature above $T_g$ and held there for a time sufficient for nucleation. The samples are then heated to the ceramization temperature and likewise held there. Three- or multi-level programs can also be used. Holding times for nucleation are from 5 min to 72 h, preferably 30 min to 2 h, and followed by a ceramization step of 3 min to 150 h, preferably 3 min to 8 h. Holding times can furthermore be replaced by slow heating rates.

On the ceramized samples, the crystal phases and their contents, as well as the transmittance in the visible range $\tau_{vis}$ [%] (on samples with a thickness of 0.7 mm) and the colour values in the Lab system (standard illuminant D65), were determined by means of XRD.

Haze was measured with a Haze-Gard dual from BYK Additives & Instruments in accordance with the ASTM D 1003 and ISO 14782 standards (on samples with a thickness of 0.7 mm).

The crystal phase contents stated in Table 1 in % by weight, based on all crystal phases present in the glass ceramic, were determined by means of X-ray diffraction measurements on a Panalytical X'Pert Pro diffractometer (Almelo, Netherlands). CuKα radiation (λ=1.5060 Å) generated via an Ni filter was used as the X-ray radiation. The standard X-ray diffraction measurements on powder and solid samples were carried out under a Bragg-Brentano geometry (θ-2θ). The X-ray diffraction patterns were measured between 10° and 100° (2θ angles). The quantification of the relative crystalline phase components and the determination of the crystallite sizes were carried out via a Rietveld analysis. Measurement was carried out on ground sample material, resulting in a clear preponderance of the volume component of the core region. The measured phase components therefore correspond to the phase distribution in the core of the glass ceramic. KSS stands for keatite solid solution, HQSS for high-quartz solid solution. The samples indicated by a "V" correspond to comparative examples. The examples that are simply numbered are examples of embodiments. The abbreviation "n.d." stands for "not determined".

TABLE 1

|  | 1 | 11 | V2 | 2 | 3 | 4 |
|---|---|---|---|---|---|---|
| $Al_2O_3$ | 19.28 | 18.93 | 18.94 | 20.04 | 19.82 | 19.92 |
| $B_2O_3$ | | | | | | |
| BaO | | 0.47 | | | | |
| CaO | 0.21 | 0.20 | 0.20 | 0.82 | 0.83 | 0.85 |
| $Fe_2O_3$ | | 0.013 | 0.013 | 0.018 | 0.019 | 0.014 |
| $K_2O$ | 0.48 | 0.05 | 0.48 | | | |
| $Li_2O$ | 4.42 | 4.48 | 4.44 | 3.70 | 3.60 | 3.67 |
| MgO | 0.50 | 0.47 | 1.39 | 1.73 | 1.59 | 1.17 |
| $Na_2O$ | 0.50 | 0.49 | 0.49 | 0.53 | 0.53 | 0.52 |
| $SiO_2$ | 68.40 | 69.00 | 69.00 | 68.90 | 69.30 | 69.00 |
| $SnO_2$ | 1.49 | 1.47 | 1.46 | 1.43 | 1.42 | 1.43 |
| SrO | 0.50 | 0.70 | 0.50 | | | |
| $TiO_2$ | 0.02 | 0.02 | 0.02 | | | |
| ZnO | 1.60 | 0.96 | 0.48 | | | 0.49 |
| $ZrO_2$ | 2.49 | 2.31 | 2.50 | 2.73 | 2.78 | 2.79 |
| Total | 99.90 | 99.56 | 99.95 | 99.95 | 99.95 | 99.93 |
| $Na_2O + K_2O$ | 0.98 | 0.54 | 0.97 | 0.53 | 0.53 | 0.52 |
| SrO + BaO | 0.50 | 1.17 | 0.50 | 0.00 | 0.00 | 0.00 |
| $MgO + Li_2O - SrO - CaO - BaO$ | 4.21 | 3.58 | 5.13 | 4.61 | 4.36 | 3.99 |
| $ZrO_2 + SnO_2$ | 3.98 | 3.78 | 3.96 | 4.16 | 4.20 | 4.22 |
| $MgO + Li_2O$ | 4.92 | 4.95 | 5.83 | 5.43 | 5.19 | 4.84 |
| $Al_2O_3/SiO_2$ | 0.28 | 0.27 | 0.27 | 0.29 | 0.29 | 0.29 |
| $(MgO+Li_2O)/(Al_2O_3/SiO_2)$ | 17.46 | 18.05 | 21.24 | 18.67 | 18.15 | 16.77 |
| Tg [° C.] | 678 | 683 | 681 | 709 | 724 | 720 |
| Nucleation [° C.] | 740 | 740 | 740 | 750 | 765 | 760 |
| Ceramization [° C.] | 830 | 850 | 830 | 945 | 950 | 880 |
| tvis | 90.20 | 89.20 | 80.80 | 90.40 | 90.40 | 90.80 |
| c* | 1.2 | 1.9 | 3.2 | 0.8 | 0.9 | 0.6 |
| L* | 96.0 | 95.6 | 92.0 | 96.2 | 96.2 | 96.3 |
| a* | −0.1 | −0.2 | 0.2 | 0.0 | −0.1 | 0.0 |
| b* | 1.2 | 1.9 | 3.2 | 0.8 | 0.9 | 0.6 |
| C | 2.1 | 3.5 | 6.4 | 1.6 | 1.6 | 1.0 |
| Haze | 1.19 | 2.25 | 21.00 | 0.61 | 0.48 | 0.34 |
| KSS phase content [% by weight] | 98.2 | 95.1 | 45.8 | 97.5 | 97.90 | 97.90 |
| HQSS phase content [% by weight] | 0.0 | 3 | 53.1 | 0.0 | 0.0 | 0.0 |
| Nucleating agent phase content [% by weight] | 1.8 | 1.9 | 1.1 | 2.5 | 2.1 | 2.1 |
| KSS Crystallite size [nm] | 69 | 66 | 75 | 73 | 74 | 64 |

|  | 5 | 6 | V3 | 7 | 8 | V4 |
|---|---|---|---|---|---|---|
| $Al_2O_3$ | 20.05 | 20.07 | 20.03 | 20.06 | 20.15 | 20.23 |
| $B_2O_3$ | | | | | | |
| BaO | | | | | 1.01 | |
| CaO | 0.82 | 0.82 | 0.82 | 0.82 | 1.01 | 0.84 |
| $Fe_2O_3$ | 0.000 | 0.000 | 0.000 | 0.000 | 0.000 | 0.013 |
| $K_2O$ | | | | | | |
| $Li_2O$ | 3.70 | 3.71 | 4.40 | 4.00 | 3.73 | 3.68 |
| MgO | 1.50 | 1.00 | 1.20 | 1.20 | 1.21 | 1.83 |
| $Na_2O$ | 0.53 | 0.53 | 0.53 | 0.53 | 0.71 | 0.53 |
| $SiO_2$ | 68.94 | 69.00 | 68.87 | 68.96 | 67.50 | 69.30 |
| $SnO_2$ | 1.43 | 1.43 | 1.43 | 1.20 | 1.44 | 1.44 |
| SrO | | | | | | |
| $TiO_2$ | | | | | | |
| ZnO | 0.30 | 0.70 | 0.00 | 0.50 | 0.50 | |

TABLE 1-continued

| | | | | | | |
|---|---|---|---|---|---|---|
| ZrO$_2$ | 2.73 | 2.73 | 2.73 | 2.73 | 2.75 | 2.08 |
| Total | 100.00 | 100.00 | 100.00 | 100.00 | 100.00 | 99.99 |
| Na$_2$O + K$_2$O | 0.53 | 0.53 | 0.53 | 0.53 | 0.71 | 0.53 |
| SrO + BaO | 0.00 | 0.00 | 0.00 | 0.00 | 1.01 | 0.00 |
| MgO + Li$_2$O − SrO − CaO − BaO | 4.38 | 3.89 | 4.78 | 4.38 | 2.92 | 4.67 |
| ZrO$_2$ + SnO$_2$ | 4.16 | 4.17 | 4.16 | 3.93 | 4.19 | 3.52 |
| MgO + Li$_2$O | 5.20 | 4.71 | 5.60 | 5.20 | 4.94 | 5.51 |
| Al$_2$O$_3$/SiO$_2$ | 0.29 | 0.29 | 0.29 | 0.29 | 0.30 | 0.29 |
| (MgO+Li$_2$O)/(Al$_2$O$_3$/SiO$_2$) | 17.88 | 16.18 | 19.24 | 17.89 | 16.54 | 18.88 |
| Tg [° C.] | 720 | 720 | 720 | 720 | 720 | 732 |
| Nucleation [° C.] | 760 | 760 | 760 | 760 | 760 | 770 |
| Ceramization [° C.] | 880 | 880 | 880 | 880 | 880 | 950 |
| tvis | 90.80 | 90.50 | 64.20 | 90.70 | 89.60 | opaque, white |
| c* | 0.6 | 0.8 | 15.7 | 0.8 | 1.6 | n.d. |
| L* | 96.3 | 96.2 | 84.1 | 96.3 | 95.8 | n.d. |
| a* | −0.1 | 0.0 | 0.4 | −0.1 | −0.2 | n.d. |
| b* | 0.6 | 0.8 | 15.7 | 0.8 | 1.6 | n.d. |
| C | 1.1 | 1.5 | 31.1 | 1.4 | 3.0 | n.d. |
| Haze | n.d. | n.d. | n.d. | n.d. | n.d. | n.d. |
| KSS phase content [% by weight] | n.d. | n.d. | n.d. | n.d. | n.d. | 98.9 |
| HQSS phase content [% by weight] | n.d. | n.d. | n.d. | n.d. | n.d. | 0.0 |
| Nucleating agent phase content [% by weight] | n.d. | n.d. | n.d. | n.d. | n.d. | 1.1 |
| KSS Crystallite size [nm] | n.d. | n.d. | n.d. | n.d. | n.d. | 88 |

| | 9 | 10 | V5 | V6 |
|---|---|---|---|---|
| Al$_2$O$_3$ | 19.83 | 19.66 | 19.17 | 18.60 |
| B$_2$O$_3$ | 0.26 | | | |
| BaO | 0.28 | 0.77 | | |
| CaO | 0.82 | 0.83 | 0.03 | 0.83 |
| Fe$_2$O$_3$ | 0.014 | 0.014 | 0.012 | 0.014 |
| K$_2$O | | | | |
| Li$_2$O | 3.60 | 3.65 | 3.79 | 4.24 |
| MgO | 1.80 | 1.16 | 1.39 | 1.81 |
| Na$_2$O | 0.54 | 0.53 | 0.08 | 0.55 |
| SiO$_2$ | 68.30 | 68.80 | 71.40 | 69.70 |
| SnO$_2$ | 1.41 | 1.42 | 1.54 | 1.41 |
| SrO | | | | |
| TiO$_2$ | | | | |
| ZnO | 0.29 | 0.49 | | |
| ZrO$_2$ | 2.68 | 2.54 | 2.49 | 2.71 |
| Total | 99.88 | 99.91 | 99.96 | 99.94 |
| Na$_2$O + K$_2$O | 0.54 | 0.53 | 0.08 | 0.55 |
| SrO + BaO | 0.28 | 0.77 | 0.00 | 0.00 |
| MgO + Li$_2$O − SrO − CaO − BaO | 4.30 | 3.21 | 5.15 | 5.22 |
| ZrO$_2$ + SnO$_2$ | 4.09 | 3.96 | 4.03 | 4.12 |
| MgO + Li$_2$O | 5.40 | 4.81 | 5.18 | 6.05 |
| Al$_2$O$_3$/SiO$_2$ | 0.29 | 0.29 | 0.27 | 0.27 |
| (MgO+Li$_2$O)/(Al$_2$O$_3$/SiO$_2$) | 18.60 | 16.83 | 19.29 | 22.67 |
| Tg [° C.] | 715 | 708 | 721 | 706 |
| Nucleation [° C.] | 755 | 750 | 770 | 745 |
| Ceramization [° C.] | 860 | 890 | 960 | 850 |
| tvis | 87.70 | 90.40 | 76.80 | opaque, white |
| c* | 3.3 | 1.0 | 7.0 | n.d. |
| L* | 95.0 | 96.1 | 90.2 | n.d. |
| a* | −0.3 | −0.1 | 0.0 | n.d. |
| b* | 3.3 | 1.0 | 7.0 | n.d. |
| C | 6.1 | 1.8 | n.d. | n.d. |
| Haze | 1.95 | 0.59 | n.d. | n.d. |
| KSS phase content [% by weight] | 97.5 | 97.9 | 97.8 | 97.8 |
| HQSS phase content [% by weight] | 0.0 | 0.0 | 0.0 | 0.0 |
| Nucleating agent phase content [% by weight] | 2.5 | 2.1 | 2.2 | 1.9 |
| KSS Crystallite size [nm] | 78 | 73 | 71 | 79 |

Examples 1 to 11 show transparent glass ceramics according to the disclosure with high transparency and low haze.

The opaque comparative example V4 shows the negative effect when the nucleating agent content is low, i.e., here $ZrO_2+SnO_2<3.6$. Low nucleating agent contents can be compensated to a certain extent by longer nucleation times, but this is often undesirable in practice for cost reasons. In the example V4, the $ZrO_2$ content of 2.08% is also too low to achieve high transmittance here. Example 11, on the other hand, with a slightly higher nucleating agent content is transparent, even if with a comparatively low transmittance.

In Comparative Examples V2, V5 and V6, the preferred condition $MgO+Li_2O—SrO—CaO—BaO<5$ is not met, which here leads to reduced transmittance (V2, V5) or even to the formation of white, opaque (V6) glass ceramics after ceramization.

In Comparative Example V3, the content of $MgO+Li_2O$ is >5.5% and the ratio $(MgO+Li_2O)/(Al_2O/SiO_2)$ of 19.24 is above the optimal value of 19 or preferably 18.8. In this case, the transmittance, at 64%, is significantly reduced.

In Example 9, the MgO content is relatively high at 1.8% by weight, but the haze value is still in the good range at 1.95, but the transmittance is rather low at 87.7%.

The MgO content is therefore preferably <1.8% by weight. In practice, the reduction in viscosity achievable by the high MgO content can compensate for the disadvantage of this reduction in transmittance.

What is claimed is:

1. A glass ceramic that is transparent and chemically prestressable or chemically prestressed with keatite as the main crystal phase, the glass ceramic comprising:
    a transmittance of $\tau_{vis} \geq 85\%$ at a thickness of 0.7 mm,
    a haze value $\leq 5$, and
    a crystal phase content of at least 80% by weight of keatite solid solution based on all crystal phases in the glass ceramic.

2. The glass ceramic according to claim 1, further comprising: a total content of $SiO_2$, $Al_2O_3$ and $Li_2O$ that is 85% or more in percent by weight of the glass ceramic, wherein $SnO_2$ and $ZrO_2$ are nucleating agents.

3. The glass ceramic according to claim 2, wherein the $SiO_2$ content is 58 to 72% by weight.

4. The glass ceramic according to claim 2, wherein the $Al_2O_3$ content is 18 to 23% by weight.

5. The glass ceramic according to claim 2, wherein the $Li_2O$ content is 2 to 5.5% by weight.

6. The glass ceramic according claim 2, wherein the content of $SnO_2$ is 1 to 2% by weight, and/or the content of $ZrO_2$ is 2.1 to 3% by weight.

7. The glass ceramic according to claim 2, further comprising a ratio of the $Al_2O_3$ to the $SiO_2$ that is <0.33.

8. The glass ceramic according to claim 2, further comprising: 0 to 2% by weight of $B_2O_3$.

9. The glass ceramic according to claim 2, further comprising: less than 2% by weight of $P_2O_5$.

10. The glass ceramic according to claim 2, further comprising less than 2% by weight of a total content of $Na_2O$ and $K_2O$.

11. The glass ceramic according to claim 2, further comprising a total content of MgO, $Li_2O$, SrO, CaO, and BaO according to the expression: $MgO+Li_2O—SrO—CaO—BaO$ is <5% by weight.

12. The glass ceramic according to claim 2, further comprising 0.1 to 2% by weight of MgO.

13. The glass ceramic according to claim 2, further comprising a total content of MgO and $Li_2O$ that is less than 5.5% by weight.

14. The glass ceramic according to claim 2, further comprising 0-2% by weight of BaO and/or 0-2% by weight of CaO and/or 0-2% by weight of SrO.

15. The glass ceramic according to claim 2, further comprising 0 to 2% by weight of ZnO.

16. The glass ceramic according to claim 2, further comprising a total content of $ZrO_2$ and $SnO_2$ that is >3.6% by weight.

17. The glass ceramic according to claim 1, wherein the glass ceramic is substantially free of $TiO_2$.

18. The glass ceramic according claim 1, wherein the glass ceramic is substantially free of $V_2O_5$, $Nd_2O_3$, and CoO.

19. The glass ceramic according to claim 1, further comprising up to 2% of one or more fining agents selected from the group consisting of: $As_2O_3$, $Sb_2O_3$, a halide, and $SO_3$.

20. A cover pane, the cover pane comprising:
    a thickness of 0.4 mm to 1 mm; and
    the glass ceramic according to claim 1,
    wherein the glass ceramic is a prestressed glass ceramic.

21. A display device comprising:
    a digital display;
    the cover pane according to claim 20,
    wherein the cover pane covers the digital display.

22. A method for producing a prestressed glass ceramic, further comprising the steps of: producing a silicate green glass by a melting process and subsequent hot shaping; temperature treating the silicate green glass with at least one nucleation step carried out in a temperature range of 690° C. to 850° C. for a period of 5 minutes to 72 hours and at least one ceramization step carried out in a temperature range of 780° C. to 1100° C. for 3 minutes to 150 hours; performing at least one ion exchange in an exchange bath having a composition of: 100% by weight to 0% by weight $KNO_3$, 0% by weight to 100% by weight $NaNO_3$, and 0% by weight to 5% by weight $LiNO_3$ at a temperature of the exchange bath between 370° C. and 500° C. and for between 2 hours and 50 hours.

23. The method according to claim 22, wherein the hot shaping comprises floating, rolling, drawing or ingot casting.

* * * * *